April 28, 1931.  W. C. WHITE  1,802,690
FLEXIBLE PIPE JOINT
Filed Oct. 26, 1927
Fig. 1.
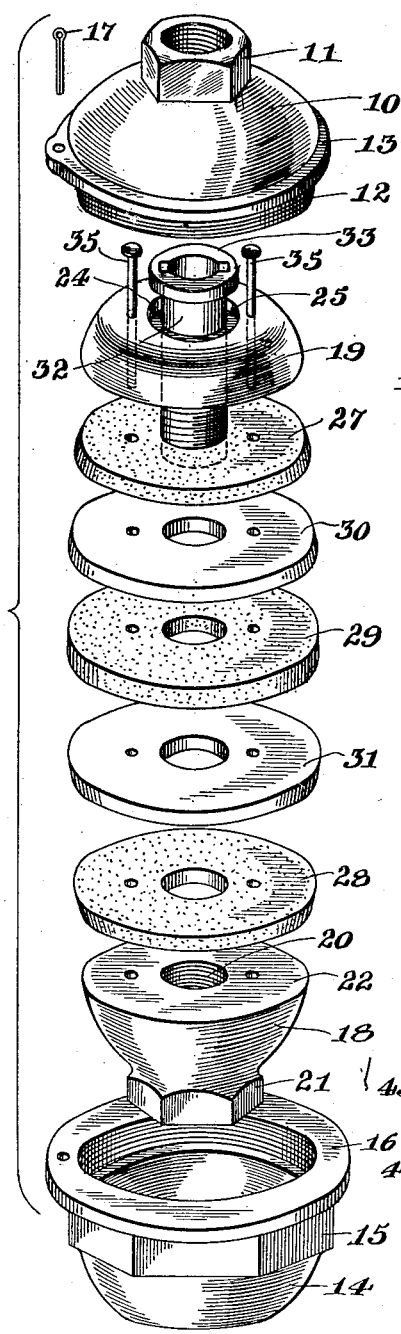
Fig. 2.
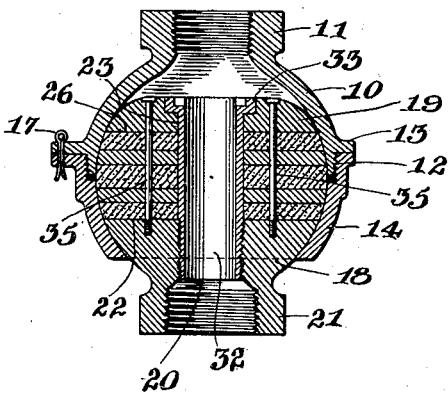
Fig. 3.
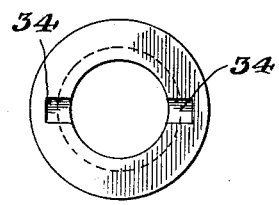
Fig. 4.
Inventor
W. C. White
By Lacey & Lacey,
Attorneys Patented Apr. 28, 1931

1,802,690

UNITED STATES PATENT OFFICE

WALTER C. WHITE, OF LOS ANGELES, CALIFORNIA, ASSIGNOR TO INTERNATIONAL COUPLERS CO., OF PITTSBURGH, PENNSYLVANIA, A COMMON-LAW TRUST

FLEXIBLE PIPE JOINT

Application filed October 26, 1927. Serial No. 228,959.

This invention relates to an improved flexible pipe joint particularly designed for use in connection with fluid pressure systems and has as one of its principal objects to provide a joint of the ball and socket type wherein the packing employed will present an unusually wide packing belt centrally of the ball to coact with the wall of the socket for insuring a leak-tight joint between the ball and socket.

The invention has as a further object to provide a joint wherein the packing will be formed of a plurality of complemental packing rings and wherein non-yielding compression members or spreaders will be interposed between the rings for effectively feeding the packing to forcibly contact with the wall of the socket.

A still further object of the invention is to provide a joint wherein the ball will be formed of sections one of which will be adapted to provide a follower for compressing and constantly feeding the packing to the wall of the socket and wherein the compression members or spreaders will cooperate with the follower for accelerating the feeding action of the packing.

The invention has as a still further object to provide a joint wherein all of the packing rings as well as the spreaders will be rigidly connected with the ball by a common coupling member and wherein said member may be adjusted for positively feeding the packing to the wall of the socket.

And the invention has as a still further object to provide a joint wherein the packing rings and spreaders will be locked against relative rotation.

Other and incidental objects will appear hereinafter. In the drawings:

Figure 1 is a perspective view showing my improved joint disassembled, the parts, however, being in proper relative position, Figure 2 is a sectional view showing the joint assembled, Figure 3 is a top plan view of the coupling member employed, and Figure 4 is a fragmentary sectional view showing a slight modification of the invention.

As previously intimated, the joint of the present invention is of the ball and socket type. For convenience, I shall first describe the socket. This socket includes a socket cup 10 provided with a nipple 11 for receiving a pipe and formed with an annular flange 12 at the inner end of which is arranged a radial stop shoulder 13. Threaded upon said flange is a socket nut 14 conforming in contour to the contour of the cup and provided with an enlarged wrench receiving portion 15 surmounted by a flange 16 abutting the shoulder 13. Removably engaged through this shoulder, the flange, and the wrench receiving portion, is a key 17 locking the cup and nut together.

Snugly fitting within the cup is the ball of the joint, the inner faces of the socket cup and nut being machined to provide a close fitting contact between the socket and ball. The ball is formed of sections and includes a body section 18 with which coacts a cap section 19 conforming to the spherical contour of the ball. Formed through the body section is a fluid passage 20 at the outer end portion of which the section is provided with a nipple 21 for receiving a pipe. This nipple corresponds to the nipple 11 of the cup. Formed on the section is a flat inner end face 22 lying at substantially right angles to the axis of the passage 20. The cap section is provided centrally with a bore 23 the outer end portion of which is counterbored to provide an annular recess 24 defining a shoulder 25 at its junction with the ball and lying at substantially right angles to the axis of said bore is the flat inner end face 26 of the section.

Interposed between the ball sections is a packing. This packing is formed of what will, for convenience, be termed upper and lower packing rings 27 and 28 respectively, and an intermediate packing ring 29. The rings 27 and 28 are of equal thickness while the ring 29 is of a thickness greater than either of the former rings. Any approved material may be employed in constructing these rings. However, the packing is either compressible or absorbent and subject to swelling and, if desired, the packing may possess both of these qualities, the packing employed in the present instance being of the latter nature. The ring 28 is engaged with the flat face 22 of the body section 18 of the ball while the ring 27 is engaged with the flat face 26 of the cap section 19. All of the rings are flat and interposed between the rings 27 and 29 is a flat compression member or spreader 30 while a similar compression member or spreader 31 is interposed between the rings 28 and 29. The spreaders are preferably formed of metal so that each of the packing rings thus lies between two rigid elements and, in this connection, it will be observed that the several packing rings and spreaders are of a combined thickness to complete the spherical shape of the ball while, at their outer edges, these rings and spreaders conform to the spherical contour of the ball.

Snugly fitting through the bore 23 of the cap section 19, through the packing rings and spreaders, and threaded in the fluid passage 20 of the body section 18 of the ball is a tubular coupling member 32 providing a continuation of said passage. This coupling member is provided with an annular overhanging head or flange 33 which is snugly received within the recess 24 of the cap section and coacts with the shoulder 25. Thus, as will be seen, the coupling member will rigidly lock the cap section of the ball to the body section and will also rigidly lock the several packing rings and spreaders thereto so that none of these elements can become dislocated even under the stress of extreme frictional drag between the ball and socket. At the same time, the cap section of the ball as well as the packing rings and spreaders, is slidable upon the coupling member so that the cap section may shift with respect to the body section. The cap section is consequently adapted to provide a follower for the packing so that fluid pressure will act upon this follower for compressing the packing rings and constantly feeding the material of the packing forcibly against the wall of the socket for providing a sealed joint between the ball and socket. The function of the spreaders 30 and 31 thus becomes apparent and, owing to the presence of the spreaders, the packing rings will be compressed between the metallic surfaces at opposite sides thereof so that the spreaders will thus cooperate with the follower in feeding the packing toward the wall of the socket and will accelerate such feeding action to materially enhance the tightness of the joint between the ball and socket. Formed in the head 33 of the coupling member are oppositely disposed wrench receiving notches 34 in which a spanner wrench may be engaged for adjustably rotating the coupling member and tightening the follower against the packing. In this way any looseness developing between the several packing rings, the spreaders, and the sections of the ball, may be readily taken up and also, the packing may thus be positively fed to the wall of the socket to further increase the tightness of the joint between the ball and socket. Since the packing is subject to swelling, the packing rings will themselves bulge against the wall of the socket so that when the fluid pressure in the joint is suddenly relieved, the packing will not contract or rebound away from the socket wall. An absolutely tight joint will thus be provided at all times. The hardness of the packing may, of course, be varied as desired to suit different conditions of use of the joint. Fitted through the follower, the packing rings, and the spreaders, are headed locking pins 35 arranged at opposite sides of the coupling member 32 and threaded into the body section 18 of the ball. The heads of these pins are normally countersunk in the follower and, as will be seen, said pins will act to lock the follower, the packing rings, and spreaders against relative rotation as well as also lock these several elements against rotation with respect to the body section of the ball. Consequently, these locking pins will cooperate with the coupling member to positively prevent any dislocation of the follower, the packing rings and spreaders.

In Figure 4 of the drawings, I have illustrated a slight modification of the invention. In this figure the body section of the ball is indicated at 36 and the cap section or follower at 37. The upper and lower packing rings are indicated at 38 and 39 respectively while the intermediate packing ring is indicated at 40. Between the packing rings 38 and 40 is a spreader 41 and between the rings 39 and 40 is a spreader 42. All of these parts are similar to corresponding parts of the preferred construction and cooperate in a similar manner. In the modified structure, the locking pins 35 of the preferred construction are eliminated and in lieu thereof locking studs are employed. A pair of locking studs 43 upstand from the body section of the ball at opposite sides of the fluid passage therethrough and slidably fit through the packing ring 39 to be received in sockets in the adjacent face of the spreader 42. This spreader is, in turn, provided with a pair of locking studs 44 which slidably fit through the packing ring 40 and are received in suitable sockets in the adjacent face of the spreader 41. Likewise, the spreader 41 is provided with a pair of upstanding locking studs 45 which slidably fit through the packing ring 38 and are received in suitable sockets in the adjacent face of the follower. Thus, the follower, the packing rings, and spreaders will be locked against relative rotation as well as rotation with respect to the body section of the ball. Otherwise, this modified construction is identical with the preferred form of the invention.

Having thus described the invention, what is claimed as new is:

A flexible pipe joint including a ball formed of a cap and a body member, a socket receiving the ball, a tubular coupling member having a plurality of spreaders and packing members slidable thereon and interposed between the cap and body member, said coupling member having one end threaded in the body member and operable upon rotation thereof to move the cap and body member toward each other to compress the packing members, and means connecting the cap and body member and passable through the spreaders and packing members to prevent relative rotation thereof.

In testimony whereof I affix my signature.

WALTER C. WHITE. [L. S.]